United States Patent [19]

Takahashi

[11] Patent Number: 4,560,292

[45] Date of Patent: Dec. 24, 1985

[54] PRINTER COMPRISING SPRING BIASED PRINT HEAD AND ROLLER PLATEN

[75] Inventor: Naoki Takahashi, Kyoto, Japan

[73] Assignee: Kabushiki Kaisha Ishida Koki Seisakusho, Kyoto, Japan

[21] Appl. No.: 591,410

[22] Filed: Mar. 20, 1984

[30] Foreign Application Priority Data

Mar. 25, 1983 [JP] Japan .............................. 58-44046[U]

[51] Int. Cl.⁴ ..................... B41J 11/04; B41J 15/06; B41J 3/20
[52] U.S. Cl. ..................................... 400/59; 400/118; 400/120; 400/586; 101/93.04; 101/288; 156/DIG. 47; 156/DIG. 49
[58] Field of Search .................. 101/216, 253, 73, 78, 101/93, 93.04, 109, 287, 288, 332, 336, 59, 120, 586, 587; 156/DIG. 28, DIG. 37, DIG. 39, DIG. 45, DIG. 47, DIG. 49; 235/58 R, 58 M, 58 CW, 58 CF, 58 PS, 58 P, 60 P, 60 TW, 60.12, 60.15; 346/50, 51

[56] References Cited

U.S. PATENT DOCUMENTS

| | | | |
|---|---|---|---|
| 573,407 | 12/1896 | Hale | 101/216 |
| 594,029 | 11/1897 | Martin | 101/216 |
| 2,470,075 | 5/1949 | Robbins | 101/216 |
| 2,603,781 | 4/1949 | Ruskin | 227/128 |
| 3,217,637 | 11/1965 | Worth | 101/228 |
| 3,975,227 | 8/1976 | Kline | 156/DIG. 45 |
| 3,997,384 | 12/1976 | Kuring | 156/DIG. 45 |
| 4,036,132 | 7/1977 | Ellefson | 101/228 |
| 4,048,913 | 9/1977 | Navi | 101/228 |
| 4,235,555 | 11/1980 | Aprato | 400/59 |
| 4,248,151 | 2/1981 | Real | 101/228 |
| 4,394,092 | 7/1983 | Osmera | 400/120 |
| 4,422,376 | 12/1983 | Teraoka | 400/120 |
| 4,432,830 | 2/1984 | Jue | 156/DIG. 47 |
| 4,473,426 | 9/1984 | Goodwin | 156/DIG. 49 |
| 4,480,933 | 11/1984 | Shibayama | 400/120 |

FOREIGN PATENT DOCUMENTS

| | | | |
|---|---|---|---|
| 0090946 | 8/1978 | Japan | 400/120 |
| 0117675 | 9/1981 | Japan | 400/120 |
| 0171978 | 10/1983 | Japan | 400/120 |

OTHER PUBLICATIONS

Carlisle Brothers Machines, Dual Process Label Printing, What's New, Printing World, Apr. 5, 1979, p. 16.

Primary Examiner—William Pieprz
Assistant Examiner—William L. Klima
Attorney, Agent, or Firm—Browdy and Neimark

[57] ABSTRACT

This device provides a printer wherein a narrow strip of sheet paper is passed between a platen roller and a print head, characterized in that one end of each of the platen roller and print head are supported in a cantilevered manner and owing to this arrangement, the gap between the printing roller and print head is open at the other end to enable the insertion of sheet paper into the gap from that end.

3 Claims, 6 Drawing Figures

PRINTER COMPRISING SPRING BIASED PRINT HEAD AND ROLLER PLATEN

BACKGROUND OF THE INVENTION

1. Field of the Invention

This invention relates to an improvement to various types of printer, such as a label printer mounted in an electronic balance.

2. Description of the Prior Art

This type of printer is so constructed that a narrow strip of sheet paper (plain paper in a journal printer, and sheet paper consisting of labels and backing paper to which the labels are pasted in a label printer) drawn out from a roll-receiving section is passed between a platen roller and a print head in pressure contact with the platen roller, which print the sheet paper or the labels on the backing paper.

In a conventional printer, both ends of each of the platen roller and the print head are fixed to support frames provided at either side of the printer.

Accordingly, it is necessary that the front end of the sheet paper is inserted into a narrow gap between the platen roller and the print head, in the direction in which the sheet is fed. Especially in a comparatively small printer, such as a printer combined with an electronic balance, there is very little space for inserting the sheet paper.

Therefore it is quite difficult to load the sheet in such a printer. Moreover, the capacity of the space holding the roll in such a printer is very small, so that the paper-loading operation must be carried out frequently.

SUMMARY OF THE INVENTION

An object of this device is to solve these problems of conventional printers, and enable the paper-loading operation of a printer to be carried out easily.

DETAILED DESCRIPTION OF THE EMBODIMENT

Figure 1:
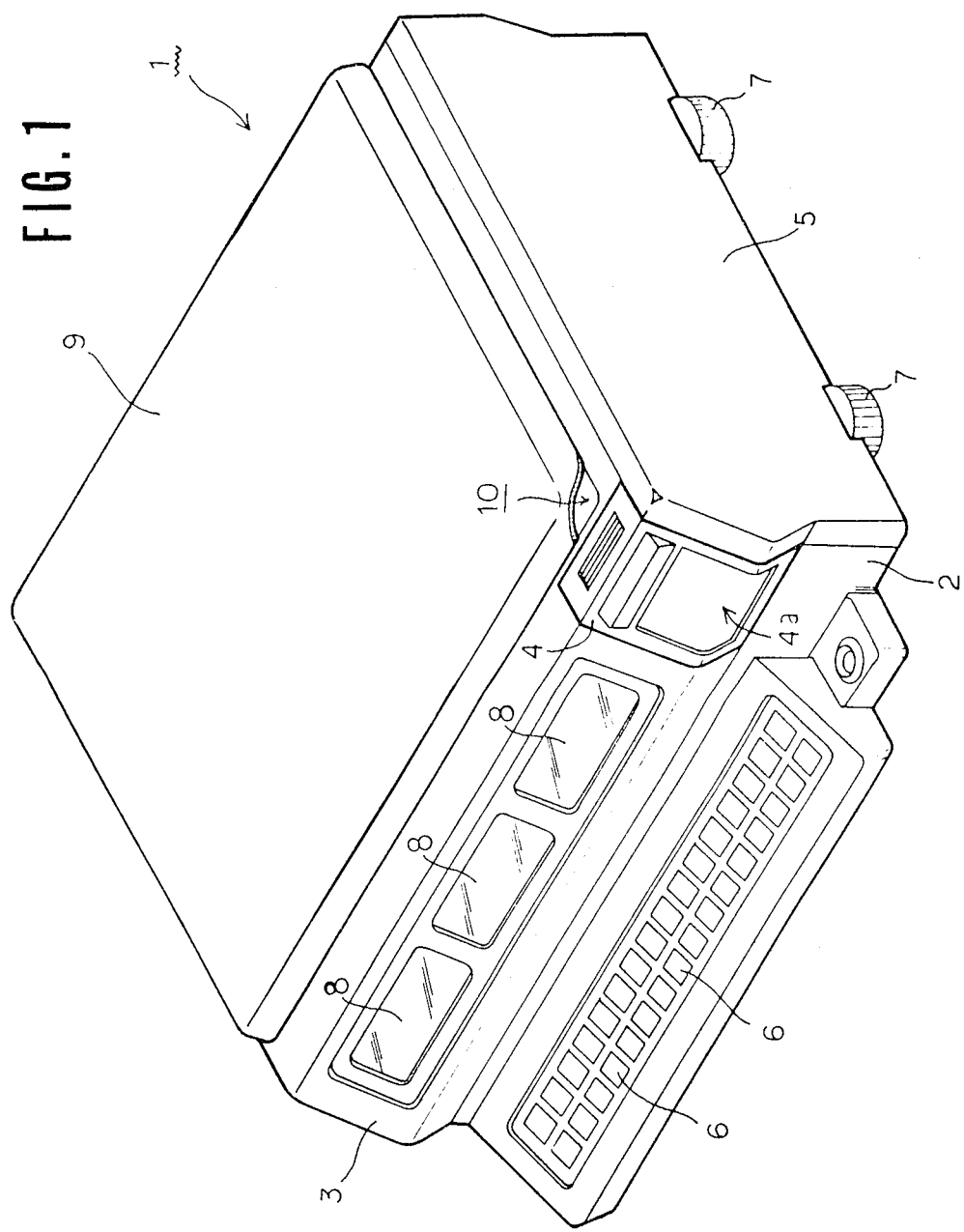
FIG. 1 is a perspective view of an entire electronic balance.

FIG. 1 shows the external appearance of an electronic balance. The casing of an electronic balance 1 consists of a lower case 2, an upper case 3, a printer cover 4 removably attached to one side of a front wall of the upper case 3, and a removable side cover 5 attached to one side of all of these parts.

Various keys 6 including ten keys for inputting data, such as the unit price of an article being measured and the weight of its package, are provided on the front surface of the lower case 2.

The four corners of the lower surface of the lower case 2 are provided with feet 7 used for leveling of the electronic balance 1.

The front surface and rear surface (not shown) with display of the upper case 3 is provided panels 8 indicating digitally thereon the unit price, weight, and total price of the article being measured.

The upper surface of the upper case 3 is provided with a weighing plate 9. The weight of an article placed on the weighing plate 9 is measured by a load cell (not shown) provided between the weighing plate 9 and the lower case 2.

The value thus obtained of the weight, and the total price and unit price calculated on the basis of the data input by the keys 6 are indicated on the display panel 8. The casing constructed as described above contains a label printer 10 in the side portion thereof which has the printer cover 4 and the side cover 5. The construction of the printer 10 will now be described.

Figure 2:
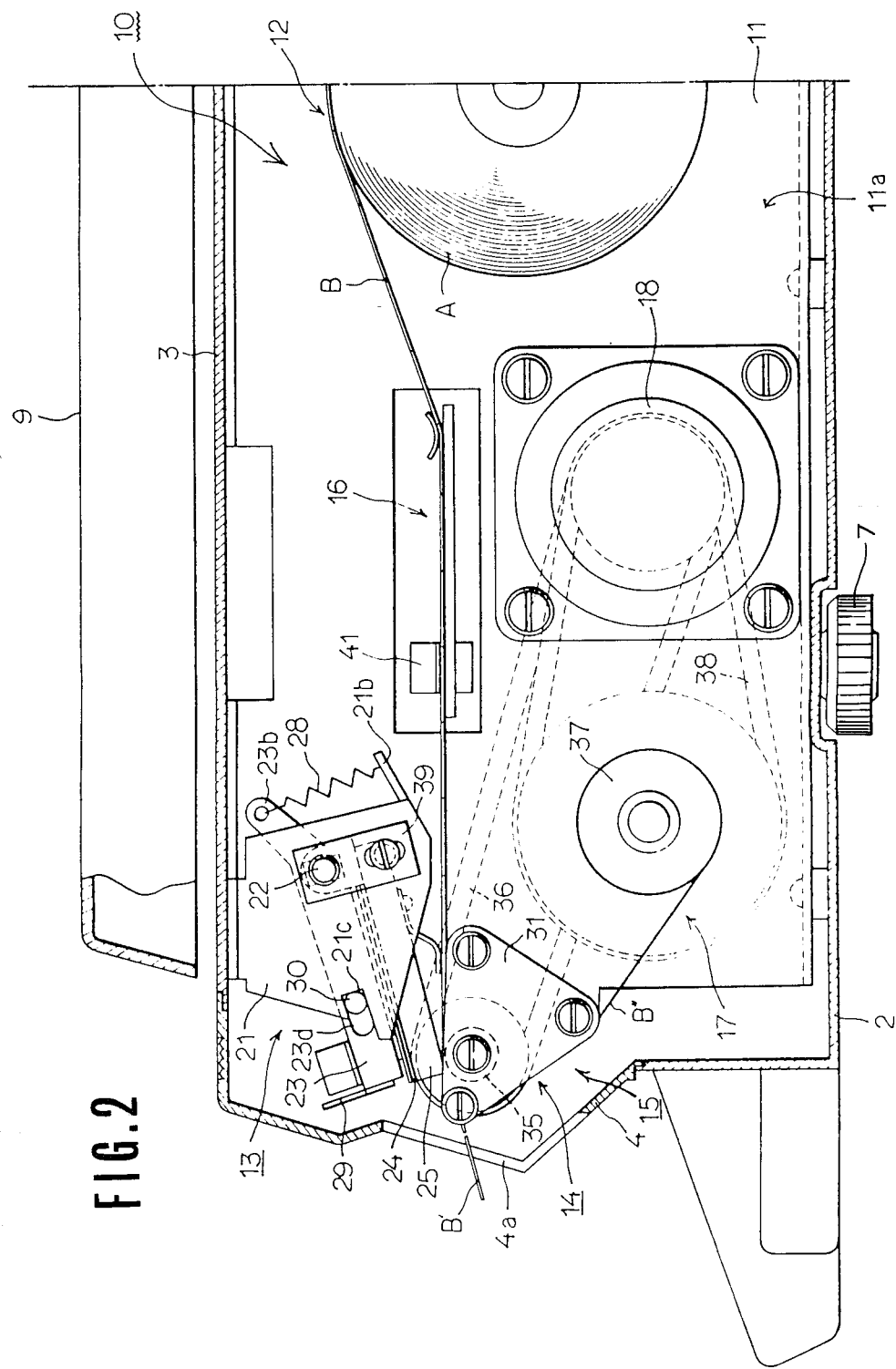
FIG. 2 is an enlarged side elevation of a printer mounted in the electronic balance.

As shown in FIG. 2, all the components of the printer 10 are arranged on a printer frame 11 mounted on the lower case 2.

A roll-holding unit 12 is provided on the right-hand side of one side surface (facing the side cover 5) 11a of the frame 11, and a print unit 15, which consists of a print head support 13 and a platen roller support 14, at the left side of the same side surface 11a.

A sheet-guiding unit 16 is provided between the roll-holding unit 12 and the print unit 15, and a backing paper take-up unit 17 is provided under the print unit 15. A motor 18 is provided below the sheet-guiding unit 16. The printer cover 4 positioned in front of the print unit 15 has a label-recovering port 4a.

Figure 3:
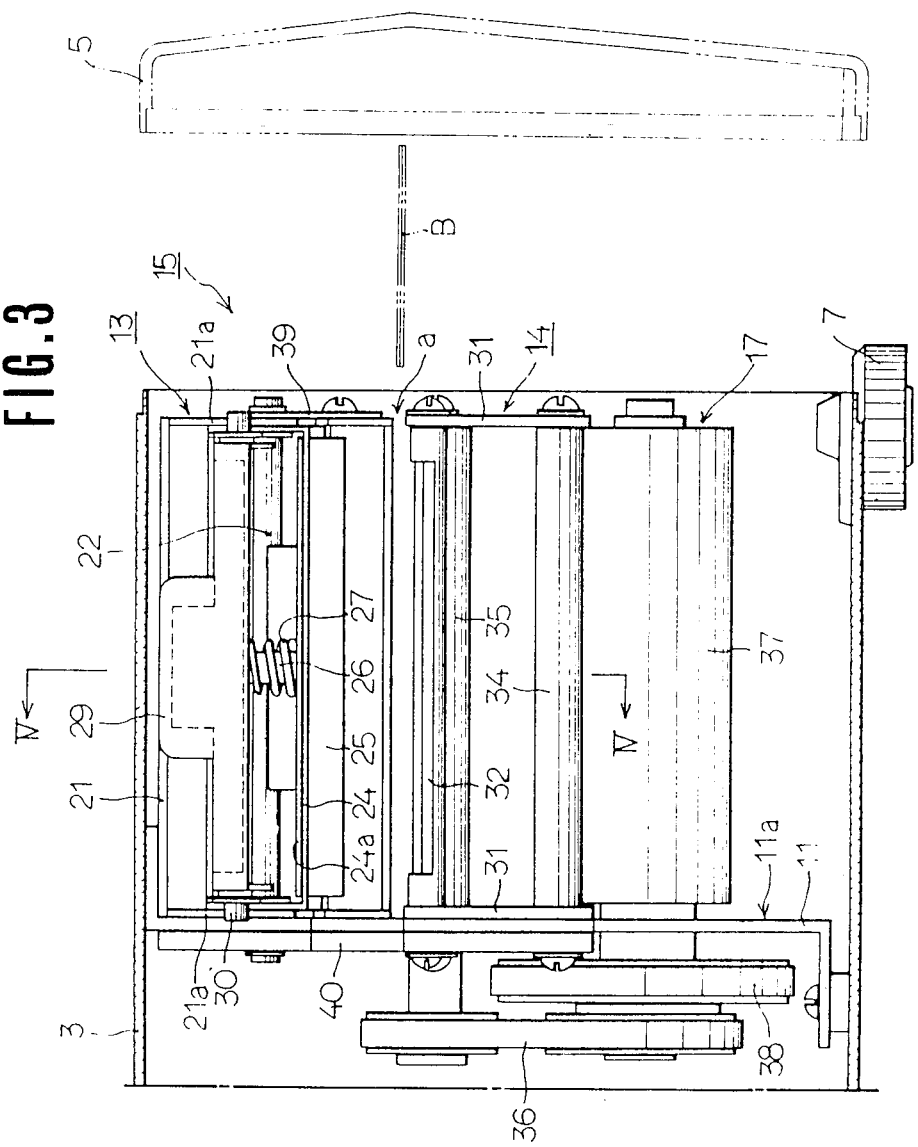
FIG. 3 is a front elevation of the printer of FIG. 2.
Figure 4:
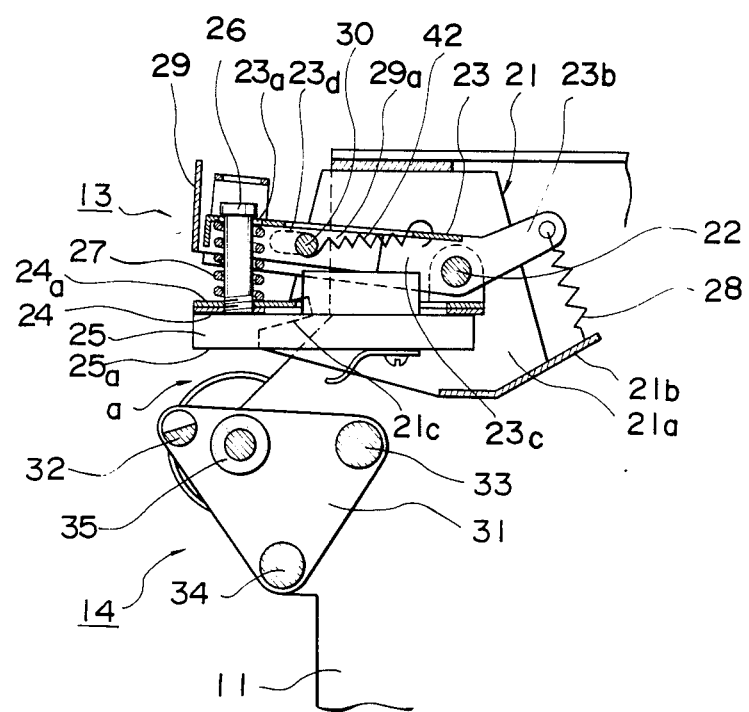
FIG. 4 is a longitudinal section through the principal portion of the printer, taken along the line IV—IV of FIG. 3.
Figure 5:
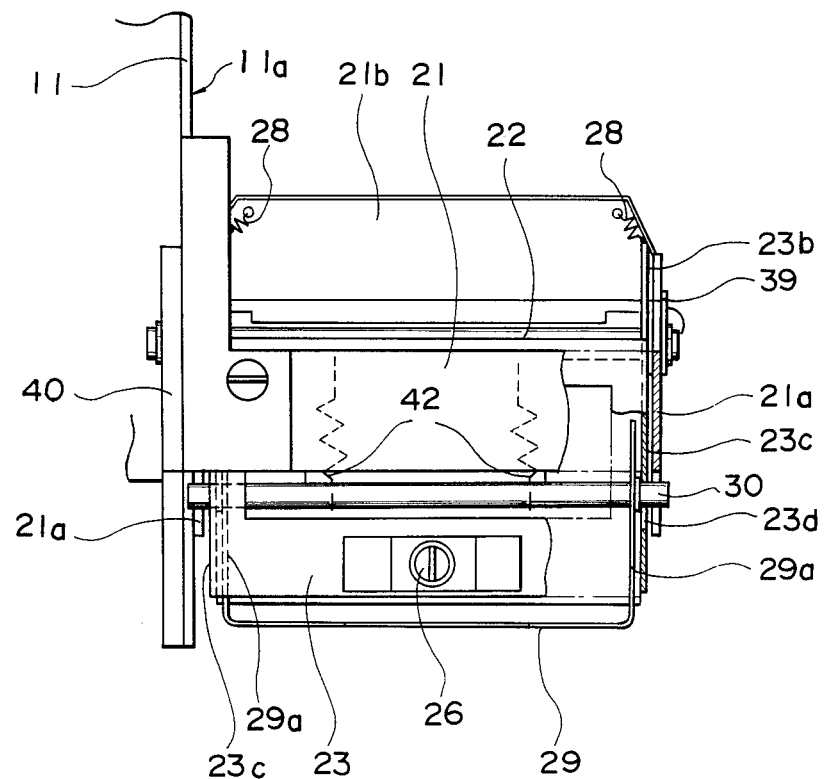
FIG. 5 is a plan view of a print head support unit.

The print head support 13 in the print unit 15 has, as shown in FIGS. 3-5, a frame 21 composed of upper, lower, right and left walls; a support shaft 22 provided between the right and left walls 21a of the frame 21; a print head-pressing member 23 of which the rear portion is supported pivotably by the support shaft 22, and the front portion can move in the vertical direction; a print headmounting member 24 below the print head-pressing member 23 of which the rear portion is also supported pivotably by the support shaft 22 and the front portion can move in the vertical direction; and a thermal head 25 attached to the lower surface of the mounting member 24.

As shown in FIG. 4, a screw 26 is inserted through a hole 23a provided in the central portion of the front portion of the pressing member 23, and its lower end is screwed into the mounting member 24.

A spring 27, which urges the pressing member 23 and mounting member 24 in such a manner that these members 23, 24 are separated from each other, is provided around the screw 26.

When no external force is applied to the spring 27, the pressing member 23 and mounting member 24 can rotate together around the support shaft 22 while kept separated from each other. When an external force is applied to the spring 27, the members 23, 24 are moved toward each other against the force of the spring 27.

An auxiliary mounting member 24a is laid over the upper surface of the mounting member 24. Both sides of the pressing member 23 are provided with rearward-projecting portions 23b. Return springs 28 are provided between the projecting portions 23b and the lower wall 21b of the frame 21.

These return springs 28 urge the pressing member 23, the mounting member 24, and the thermal head 25 in the direction in which the front portions of these parts are pulled upward.

As shown in FIGS. 4 and 5, a release lever 29, which is U-shaped in plan view, is provided between right and left walls 23C of the pressing member 23. Both ends of a lock pin 30 provided between right and left portions 29a of the lever 29 engages with elongated holes 23d formed in the right and left walls 23c of the pressing member 23, to enable the lever 29 and lock pin 30 to be slid forward and backward within a predetermined range with respect to the pressing member 23.

A plurality of tension springs 42 are provided between the lock pin 30 and the pressing member 23 to urge the lock pin 30 constantly toward the end surfaces of the elongated holes 23d which are on the side of the support shaft 22.

The front lower portions of the right and left walls 21a of the frame 21 are provided with recesses 21c, shown in FIG. 2.

When the pressing member 23 is rotated downward to a predetermined position, both end portions of the pin 30 engage with the recesses 21c, due to the tensile force of the springs 42, as shown in FIG. 2. Consequently, the pressing member 23 is held in a predetermined position against the force of the return springs 27 and 28.

Figure 6:
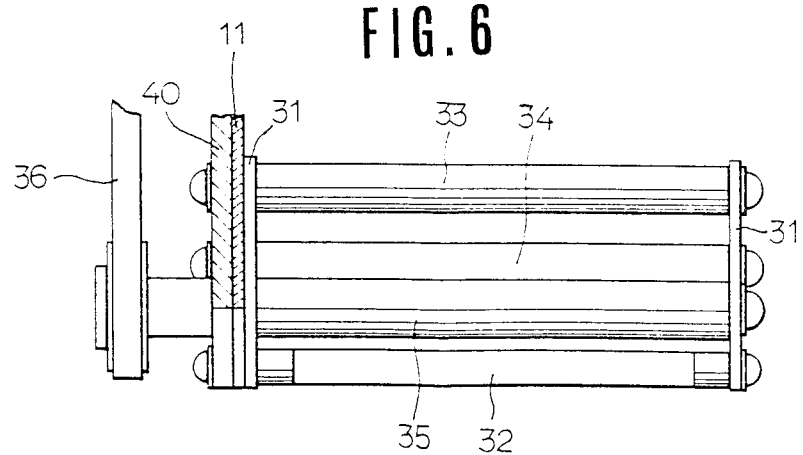
FIG. 6 is a plan view of a platen roller support.

The platen roller support 14 under the print head support 13 consists, as shown in FIGS. 4 and 6, of a pair of inverted pyramid-shaped side members 31 connected together by three shafts 32, 33, 34, and a platen roller 35 supported rotatably between portions of the two side members 31 which are slightly further back than the front shaft 32. The front shaft 32 is made by cutting off the upper half portion of a rod so that it has a semi-circular cross-section, and acts as a label-peeling shaft. The positional relationship between the platen roller support 14 and the print head support 13 is as follows. When the pressing member 23, mounting member 24 and thermal head 25 are rotated downward, the lower surface of the thermal head 25 touches an upper portion of the circumferential surface of the printing roller 35 first.

When the pressing member 23 is further rotated in the downward direction against the force of the spring 27, the lock pin 30 engages with the recesses 21c in the frame 21, due to the tensile force of the springs 42.

The print head support 13 and the platen roller support 14, which are constructed as described above, are attached in a cantilever fashion to the printer frame 11, as shown in FIG. 3.

Namely, the print head support 13 is attached by one side wall 21a of its frame 21 to the surface 11a of the printer frame 11, and the platen roller support 14 is attached by one side member 31 to the same surface 11a of the printer frame 11, the supports 13, 14 thus projecting toward the side cover 5. Accordingly, a gap a between the supports 13, 14 is open at the end on the side of the side cover 5.

The platen roller 35 is driven by the motor 18 via a belt 36, a take-up roller 37 in the backing paper take-up section 17 is also driven by the motor 18 via a belt 38.

In order to keep the backing paper take-up speed determined by the roller 37 equal at all times to the sheet feed speed determined by the platen roller 35, the rotational speeds of the rollers 35, 37 are set appropriately, and a slip mechanism (not shown) is provided in a drive unit for the roller 37.

In the embodiment shown in the drawings, the support shaft 22 in the print head support 13 is attached at one end via a regulator plate 39, which can slide vertically with respect to the frame 21, for regulating the contact condition of the thermal head 25 and the platen roller 35.

In order to secure the rigidity of the joints between the print head support 13 and the platen roller support 14 and the printer frame 11, a reinforcing plate 40 is attached to a rear surface of the frame 11.

In addition, the sheet-guiding unit 16 is provided with a sensor 41, as shown in FIG. 2, used for counting the number of labels on the backing paper which pass the sensor 41, or for timing the feeding of labels and the printing thereof.

According to the embodiment with this construction, a narrow strip of label sheet B drawn out from a sheet roll A held in the roll-holding unit 12 is supplied to the print unit 15 via the sheet-guiding unit 16, as shown in FIG. 2.

While the sheet B passes between the platen roller 35 and the thermal head 25, which is pressed into contact with the roller 35, in the print unit 15, figures representing, for example, the weight or the price of an article being measured, which is placed on the weighing plate 9 of FIG. 1, are printed on a label thereon.

When the direction of movement of the forwardly-moving sheet B is then changed through an acute angle to a downward direction by the label-peeling shaft 32, a label B' is peeled from backing paper B''. The label B' is discharged outside through the recovery port 4a in the printer cover 4, while the backing paper B'' is taken up around the roller 37 in the backing paper take-up unit 17.

During this time, the thermal head 25 is pressed into contact with the label sheet B on the platen roller 35 by the spring 27 provided between the print head-pressing member 23 and the print head-mounting member 24 of the print head support 13, with the pressing member 23 fixed to the frame 21 by the lock pin 30.

Therefore, the thermal head 25 is pressed against the label at a suitable surface pressure in a uniform manner over the whole width of the label, so that the label can be printed correctly.

In order to load the label sheet B as shown in FIG. 2, the lock pin 30 of the print head support 13 is drawn forward by the release lever 29 against the force of the tension springs 42 so that it is disengaged from the recesses 21c.

As a result, the print head pressing member 23, print head mounting member 24 and the thermal head 25 are rotated upward by the action of the return springs 28 to produce a gap a between the lower surface 25a of the print head 25 and the platen roller 35 of the printing roller support 14, as shown in FIGS. 3 and 4, so that the label sheet B can be freely inserted into the gap or paper path a. Thus, the printer is converted from a printing mode to a paper loading mode.

After the side cover 5 has been removed, as shown in FIG. 3, the label sheet B can be inserted into the gap a from one side thereof since the print head support 13 and the platen roller support 14 are attached to the printer frame in a cantilevered manner to enable the gap a to be open at one side.

Accordingly, the loading operation can be carried out very easily, compared with the similar operation in a conventional printer in which the front end of the label sheet is inserted into the gap between the print head and the platen roller in the direction in which the sheet advances.

The device in this application can not only be used in a printer in an electronic balance, as shown in this embodiment thereof, but can also be used in an independent printer. It can also be used in a journal printer, in which a sheet of paper is directly printed.

According to this device described above, which is directed to a printer in which a narrow strip of sheet paper is passed between a print head and a platen roll so that the sheet can be printed, the operation of inserting the sheet paper between the print head and the platen roller can be carried out very easily.

This enables the elimination of the difficulties involved in loading paper into a printer of this kind, especially into a miniaturized printer, which has a small roll capacity, and which requires frequent paper-loading.

What is claimed is:

1. A printer wherein a narrow strip of sheet paper drawn out from a roll-holding section is passed between a platen roller and a print head, said printer comprising:

a paper path extending from a paper holding unit and passing between said print head and platen roller having a clearance determined by the distance between said print head and said platen roller;

means for supporting said platen roller and print head in a cantilevered manner on a first frame, said print head being capable of rotation upon said frame, said support means including a pivot means, comprising a shaft, about which said rotation may occur, said rotation being such that the clearance between said print head and printing roller may be increased or decreased dependent upon the direction of said rotation, said printer being in a print mode when said clearance is substantially at a minimum and in a paper loading mode when said clearance is sufficient to permit said narrow sheet of paper to be freely inserted between said print head and said print roller;

means for locking said printer in said paper loading mode;

means for biasing said print head against said platen roller when said printer is in said printing mode; and a removable said cover, said paper path being positioned so that, when said side cover is removed, an open side is formed from which a paper holding unit may be rotatably placed for support within said printer and paper from said paper holding unit freely inserted in said paper path when said printer is in said paper loading mode, said support means further comprising printing a head support, including a second frame attached thereto and mounted to said first frame, and a pressing member, said print head being attached to said pressing member by a first spring for biasing said print head toward said platen roller when said printer is in a print mode, said pressing member being pivotally mounted on said second frame about said pivot means.

2. The printer of claim 1, wherein said pressing member has a means defining an elongated hole having a locking pin therein, said locking pin being biased by a second spring backward along a direction in said hole toward said shaft, said second frame includes a recess therein, and said locking pin in attached to a release lever so that when said release lever is pulled forward, said locking pin moves within said hole against the biasing force of said second spring and said pressing member may then be pivoted about said shaft and said locking pin inserted into said recess and locked into said recess upon cessation of said pulling forward of said release lever, thereby placing said printer in said printing mole.

3. The printer of claim 2, further comprising a third spring extending between said pressing member and said second frame attached to points on said pressing member and said second frame that are located rearward of said pivot means, said third spring biasing said pressing member and said print head away from said platen roller.

* * * * *